US006697504B2

(12) United States Patent
Tsai

(10) Patent No.: US 6,697,504 B2
(45) Date of Patent: Feb. 24, 2004

(54) METHOD OF MULTI-LEVEL FACIAL IMAGE RECOGNITION AND SYSTEM USING THE SAME

(75) Inventor: Kun-Cheng Tsai, Taipei (TW)

(73) Assignee: Institute for Information Industry, Taipei (TW)

( * ) Notice: Subject to any disclaimer, the term of this patent is extended or adjusted under 35 U.S.C. 154(b) by 622 days.

(21) Appl. No.: 09/736,264

(22) Filed: Dec. 15, 2000

(65) Prior Publication Data

US 2002/0076088 A1 Jun. 20, 2002

(51) Int. Cl.[7] .............................. G06K 9/00; G06K 9/62; G06F 15/18; G06T 1/40
(52) U.S. Cl. ..................... 382/118; 382/115; 382/156; 382/157; 706/20; 375/240.19
(58) Field of Search ................................ 382/115, 116, 382/118, 119, 124, 155, 156, 157, 158, 159; 340/5.53, 5.83; 706/15, 16, 20, 22, 25; 375/240.19

(56) References Cited

U.S. PATENT DOCUMENTS

| | | | | |
|---|---|---|---|---|
| 5,497,430 A | * | 3/1996 | Sadovnik et al. | 382/156 |
| 5,572,596 A | * | 11/1996 | Wildes et al. | 382/117 |
| 5,576,548 A | * | 11/1996 | Clarke et al. | 250/369 |
| 5,729,662 A | * | 3/1998 | Rozmus | 706/20 |
| 5,809,490 A | * | 9/1998 | Guiver et al. | 706/16 |
| 5,842,194 A | * | 11/1998 | Arbuckle | 706/52 |
| 5,870,502 A | * | 2/1999 | Bonneau et al. | 382/249 |
| 5,995,644 A | * | 11/1999 | Lai et al. | 382/131 |
| 6,105,015 A | * | 8/2000 | Nguyen et al. | 706/26 |
| 6,421,467 B1 | * | 7/2002 | Mitra | 382/240 |
| 6,480,615 B1 | * | 11/2002 | Sun et al. | 382/103 |

FOREIGN PATENT DOCUMENTS

TW          477959 A   *  3/2002  ........... G06T/15/00

OTHER PUBLICATIONS

Palisson et al. "Unsupervised multiresolution texture segmentation using wavelet decomposition." Image Processing, 1994. Proceedings ICIP–94, IEEE International Conference, vol. 2, Nov. 13–16, 1994, pp 625–629.*

Mitra et al. "Efficient coding by neuro–fuzzy clustering in vector quantization of wavelet decomposed signals." Fuzzy Information Processing Society, 1996. NAFIPS. 1996 Biennial Conference of N. American, Jun. 19–22, 1996, pp 229–233.*

Pramadihanto et al. "Face recognition from single view based on flexible neural network matching." 5th IEEE International Workshop on Robot and Human Communication, 1996. Nov. 11–14, 1996, pp 329–334.*

Oh et al. "Image classification and retrieval based on wavelet–SOM." Database Applications in Non–Traditional Environments, 1999. (DANTE '99) Proceedings. International Symposium, pp 164–167.*

* cited by examiner

Primary Examiner—Jingge Wu
Assistant Examiner—Ryan J. Hesseltine
(74) Attorney, Agent, or Firm—Bacon & Thomas, PLLC

(57) ABSTRACT

A quadrature mirror filter is applied to decompose an image into at least two sub-images each having a different resolution. These decomposed sub-images pass through self-organizing map neural networks for performing a non-supervisory classification learning. In a testing stage, the recognition process is performed from sub-images having a lower resolution. If the image can not be identified in this low resolution, the possible candidates are further recognized in a higher level of resolution.

8 Claims, 6 Drawing Sheets

METHOD OF MULTI-LEVEL FACIAL IMAGE RECOGNITION AND SYSTEM USING THE SAME

BACKGROUND OF THE INVENTION

1. Field of the Invention

The present invention relates to the field of image recognition, and more particularly, to a method of multi-level facial image recognition and a system using such a method to recognize facial image.

2. Description of Related Art

Currently, although there are several recognition techniques available in the facial image recognition, such as feature mode, pattern matching mode, or neural network mode, etc., these techniques can not satisfy the practical requirements. For example, when using the method of feature extraction to recognize the facial image, there are three problems encountered, which are: (1) What are the features required? (2) How many features are necessary? (3) The extraction of the features is not easy.

As to the method of pattern matching, there is a large amount of calculations required for performing a recognition. Therefore, when the image to be matched is large, the time required will be increased greatly. Moreover, it is generally difficult to define a suitable evaluation standard of the matching similarity. In addition, it is also difficult to utilize the automatic learning and recognition capabilities of the neural network for performing facial image recognition due to the complexity and fineness of the variation of the face expression. Thus, a neural network with a simple structure can not be used to analysis and distinguish the difference of facial features. Therefore, it is desirable to provide an improved method and system for recognizing the facial image, so as to mitigate and/or obviate the aforementioned problems.

SUMMARY OF THE INVENTION

The object of the present invention is to provide a method of multi-level facial image recognition and a system using the same for reducing the amount of data to be compared in the recognition process thereby greatly increasing the recognition speed.

According to one aspect, the present invention which achieves the object relates to a method of multiple stage face image identification, comprising the steps of: (A) inputting an original image of a face; (B) performing a pre-process to trim the original image into a facial image only containing a complete face image; (C) decomposing the facial image into N resolutions, each having M channels, where $N \geq 2$ and $M \geq 2$, so that the facial image is decomposed into N×M sub-images; (D) in a learning stage, using a front facial image with a normal expression as a learning image; inputting sub-images decomposed from the learning image to N×M self-organizing map neural networks, respectively, for performing a non-supervisory classification learning; when the neural networks complete a predetermined learning process, the sub-images of the learning image being input to M neural networks that has completed the learning again, so that each neural network generates a winning unit; and (E) in a testing stage, decomposing a test image thereby starting from the M sub-images having a lowest resolution and inputting the sub-images into the corresponding self-organized map neural networks for generating M winning units; performing a recognition decision process for determining distances from the M winning units to the winning units of each learning image in a corresponding self-organizing map neural network thereby finding possible candidates, and if there is only one candidate, the candidate being a winner and the decision process being completed, while there are more than one candidates, the candidates being retained for performing a decision process in a relative high level of resolution.

According to another aspect, the present invention which achieves the object relates to a multi-level facial image recognition system comprising: means for inputting an original image of a face; means for performing a pre-process to trim the original image into a facial image only containing a complete face image; means for decomposing the facial image into N resolutions, each having M channels, where $N \geq 2$ and $M \geq 2$, so that the facial image is decomposed into N×M sub-images; and a plurality of self-organizing map neural networks, wherein, in a learning stage, a front facial image with a normal expression is used as a learning image; the sub-images decomposed from the learning image are input to N×M self-organizing map neural networks, respectively, for performing a non-supervisory classification learning; when the neural networks complete a predetermined learning process, the sub-images of the learning image are input to M neural networks that has completed the learning again, so that each neural network generates a winning unit; and wherein, in a testing stage, a test image is decomposed thereby starting from the M sub-images having a lowest resolution and inputting the sub-images into the corresponding self-organized map neural networks for generating M winning units; a recognition decision process is performed for determining distances from the M winning units to the winning units of each learning image in a corresponding self-organized map neural network thereby finding possible candidates, and if there is only one candidate, the candidate is a winner and the decision process is completed, while there are more than one candidates, the candidates are retained for performing a decision process in a relative high level of resolution.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
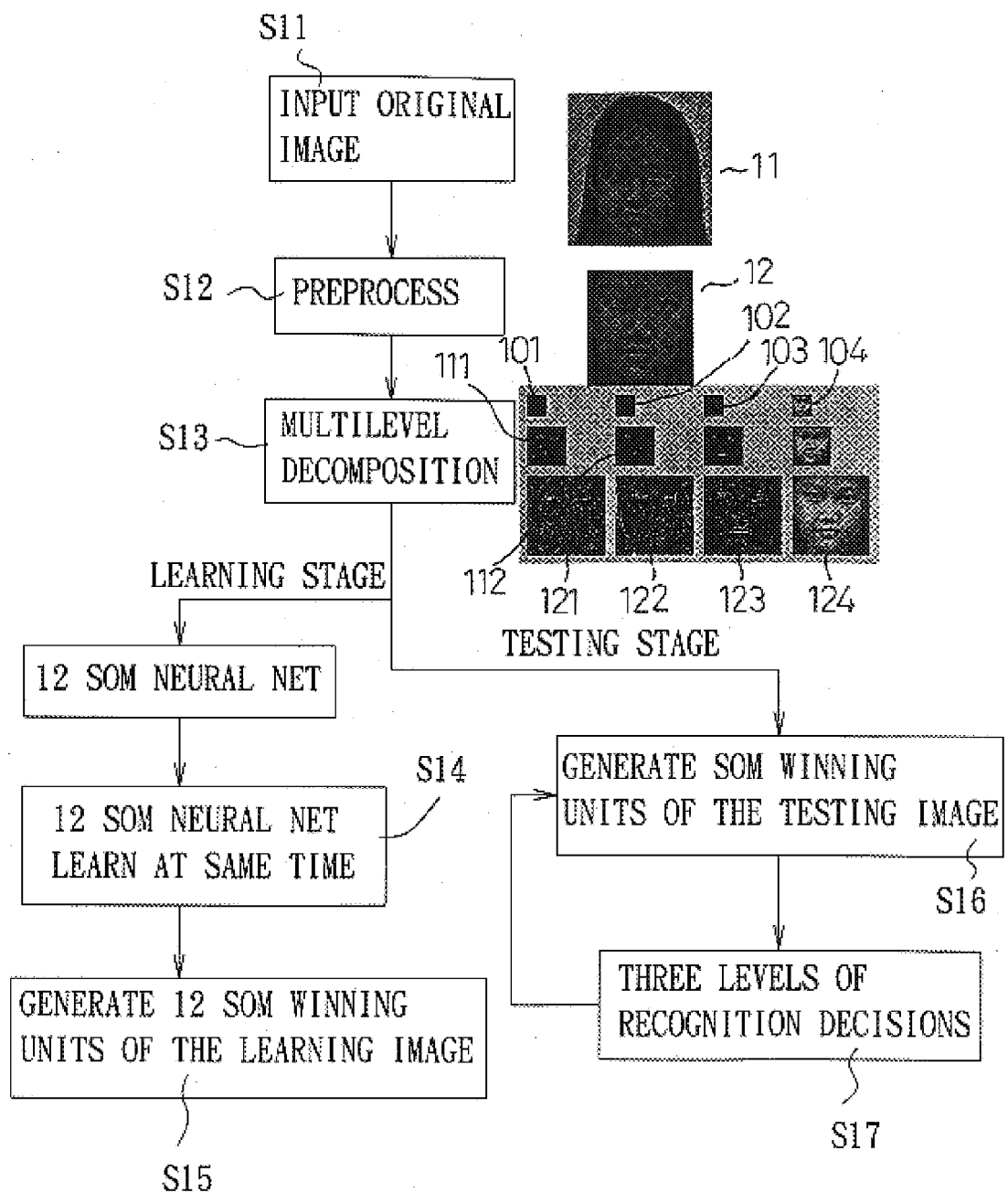
FIG. 1 is a structural view of the multi-level facial image recognition system in accordance with the present invention.

With reference to FIG. 1, the flow diagram of a preferred embodiment of the multi-level facial image recognition method according to the present invention is illustrated, wherein the data at the input of the system is a facial image of a tester captured by a camera. This original image 11 is input to the system (step S11). In step S12, a pre-process is executed to trim the original image 11 into an image only containing the facial image 12, and the image is adjusted into an image of 128×128 pixels.

In step S13, the face image 12 is decomposed into at least two resolutions, each resolution having a plurality of channels. In this preferred embodiment, the facial image 12 is decomposed into three resolutions. Each resolution has four channels. As a result, the facial image 12 is decomposed into 12 sub-images 101~104, 111~114, 121~124.

Figure 2:
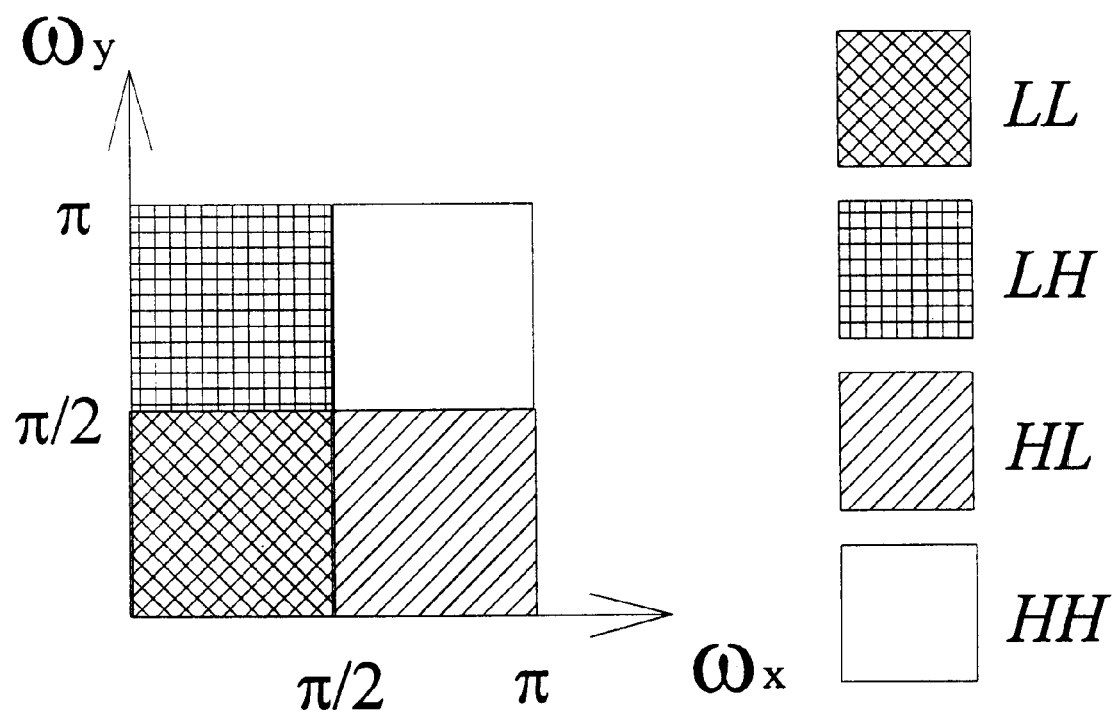
FIG. 2 is a plane view showing the division of a frequency plane according to a quadrature mirror filter.
Figure 3:
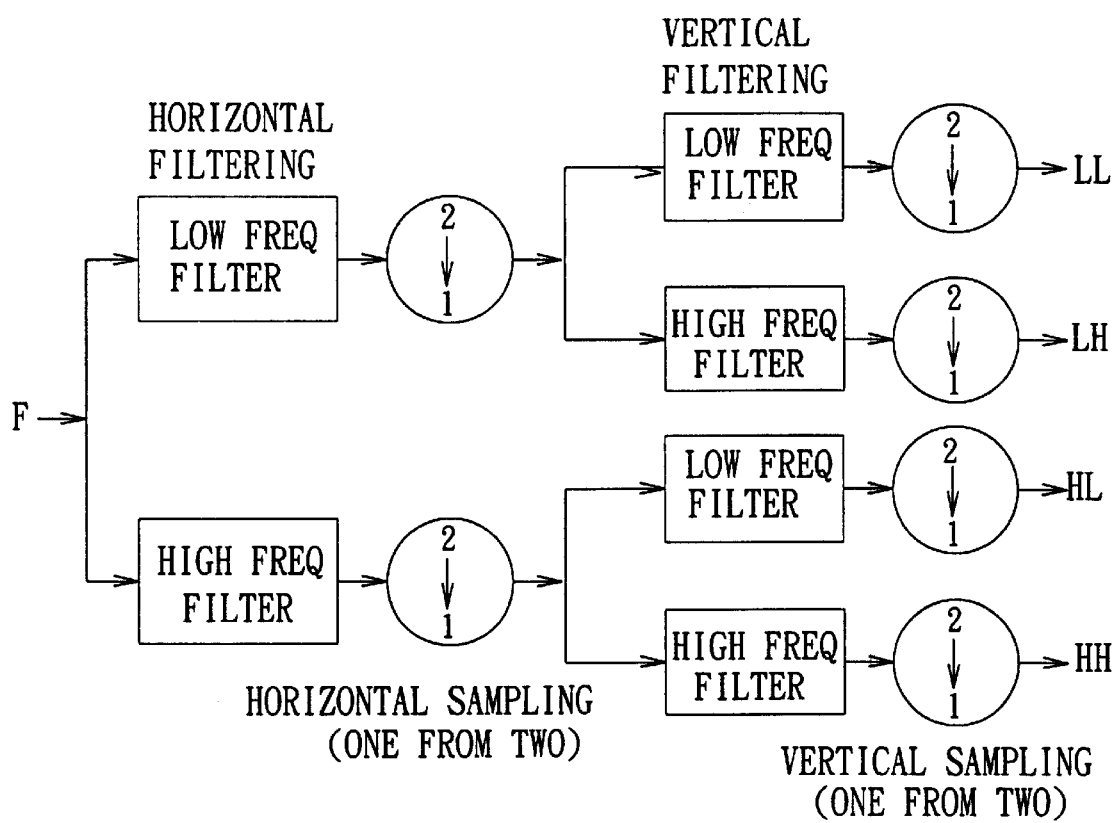
FIG. 3 is a schematic view showing the decomposition process of the quadrature mirror filter.

Step S13 is executed by using a quadrature mirror filter (QMF) to decompose the facial image 12. Such a quadrature mirror filter employs the wavelet decomposition to provide a separable feature and perfectly recombine the image. FIG. 2 shows the frequency dividing of a plane for the decomposition of a quadrature mirror filter. FIG. 3 shows the decomposing process of a quadrature mirror filter.

Figure 4:
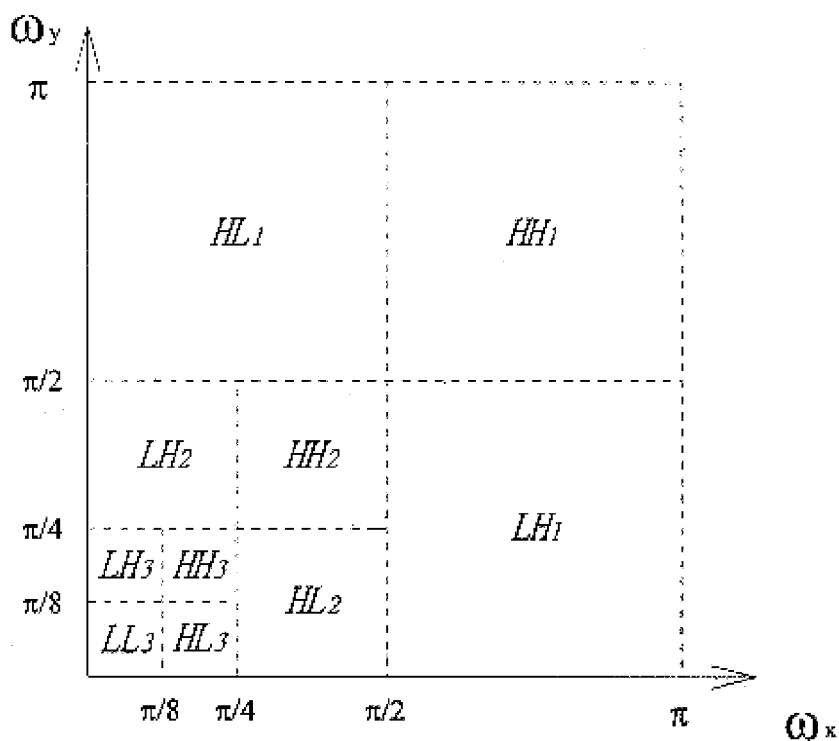
FIG. 4 is a plane view showing the division of a frequency plane according to quadrature mirror filter with three levels of resolutions.
Figure 5:
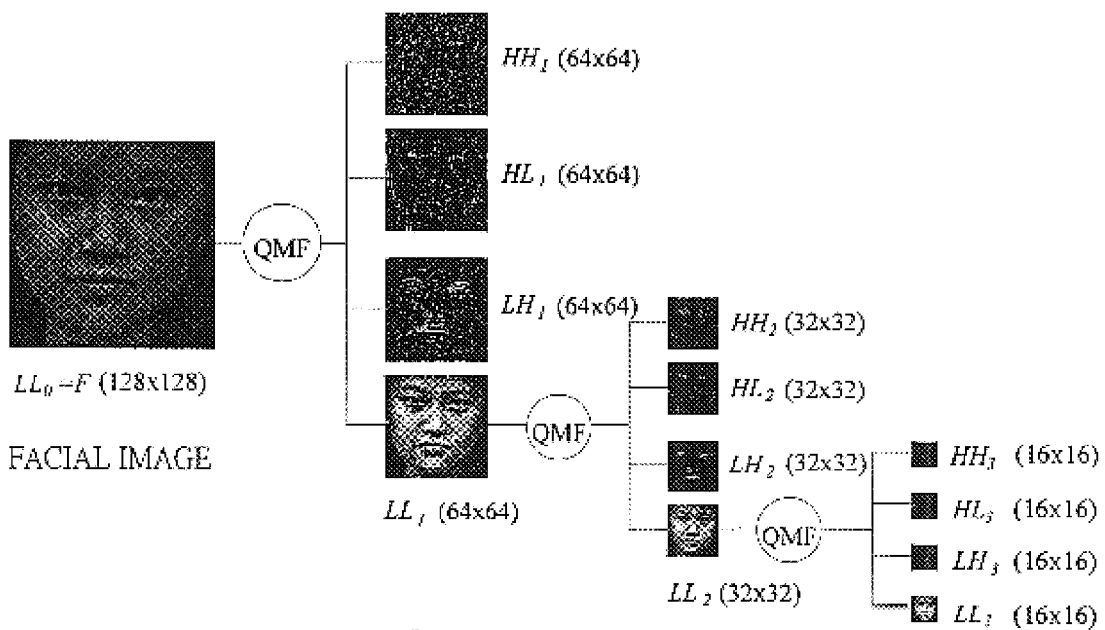
FIG. 5 is a schematic view showing the decomposition process according to the quadrature mirror filter with three levels of resolutions.

FIG. 4 shows that, in the system of the present invention, an image is decomposed into three resolutions by a quadrature mirror filter. Each resolution has four channels. The decomposed 12 sub-images is denoted by $HH_i$, $HL_i$, $LH_i$, $LL_i$, where the subscript represents the sub-image decomposed through i times from an original image. In each decomposition process, only the low frequency sub-image $LL_{i-1}$ with one higher level of resolution is decomposed. Since the sub-image $LL_{i-1}$ includes the low frequency and high frequency data of this level of resolution, the sub-images $HH_{i-1}$, $HL_{i-1}$, $LH_{i-1}$ images only contains the edges and pits with extra brightness. When i=1,2,3, the resolutions of the sub-images are 64×64、32×32及16×16, respectively. FIG. 5 shows the decomposition of the above quadrature mirror filter having three resolutions and four channels.

Figure 6:
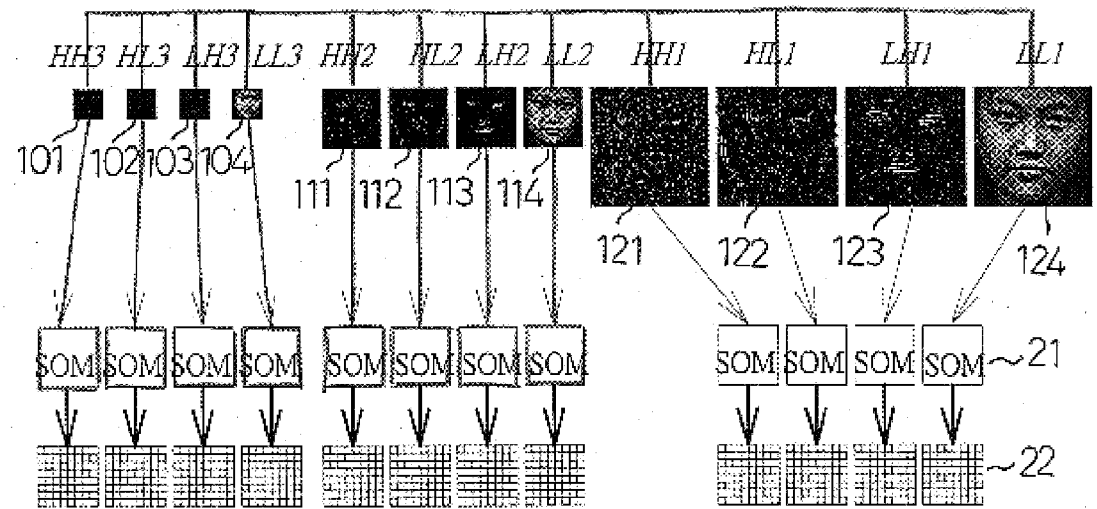
FIG. 6 is a structural view showing the learning stage of the multi-level facial image recognition system in accordance with the present invention.

With reference to FIGS. 1 and 6, in a learning stage, a front facial image with normal expression of each tester is used as a learning image of the system. The sub-images 101~104, 111~114, 121~124 decomposed from the learning image are input into 12 SOM (Self-Organizing Map) neural network, respectively, for performing a non-supervisory classification learning (step 14) so as to generate a feature graph 22.

Figure 7:
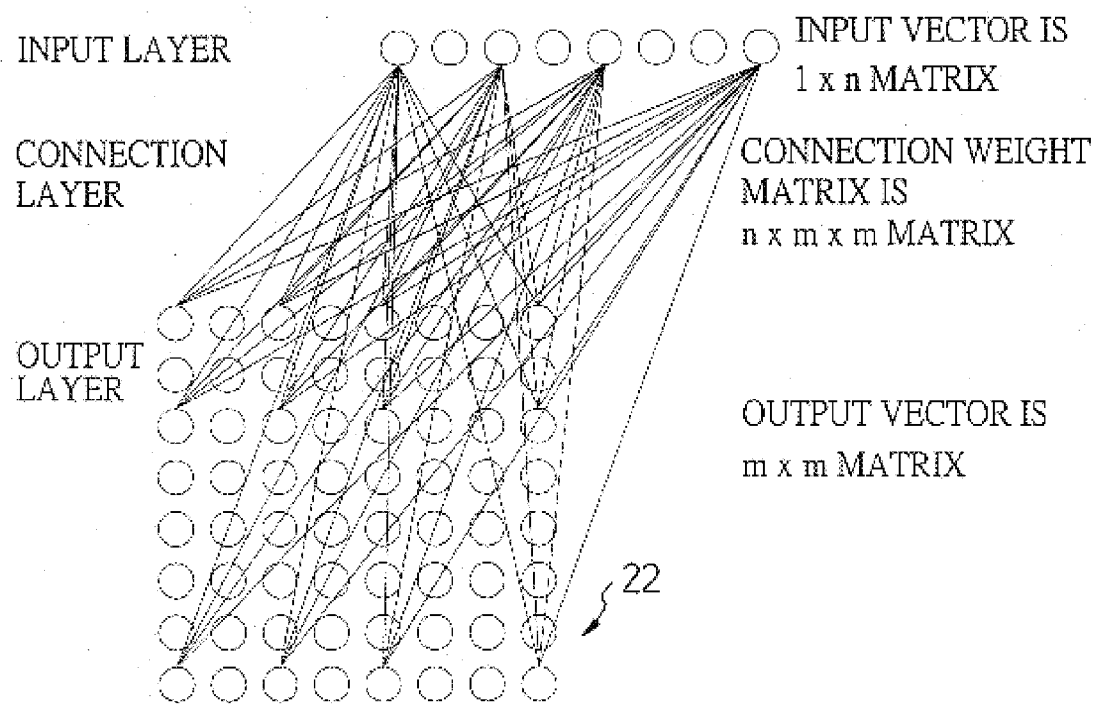
FIG. 7 is a structural view of the self-organizing map neural nets.

FIG. 7 shows the structure of the aforesaid SOM neural network 21, wherein the input layer serves to represent the input variables of the network, i.e., the input facial image vectors of. Therefore, the 12 sub-images decomposed by the quadrature mirror filter will be input into 12 SOM neural networks 21 for learning. The output layer serves to represent the output variables of the network, i.e., the positions on the feature graph 22 of the facial sub-images mapped through the SOM neural networks 21. The connection layer has vectors formed by the weight values of the connections between each input unit and output unit. After the network completes the learning procedure, the adjacent output units will have similar connection weight values.

Referring to FIGS. 1 and 6, further, when the SOM neural net 21 accomplishes a preset learning period. The sub-image of the learning image of each tester is again inputted into the 12 SOM neural nets 21 having completing the learning process so that each tester generates a wining unit in each SOM neural net 21 (step S15).

Figure 8:
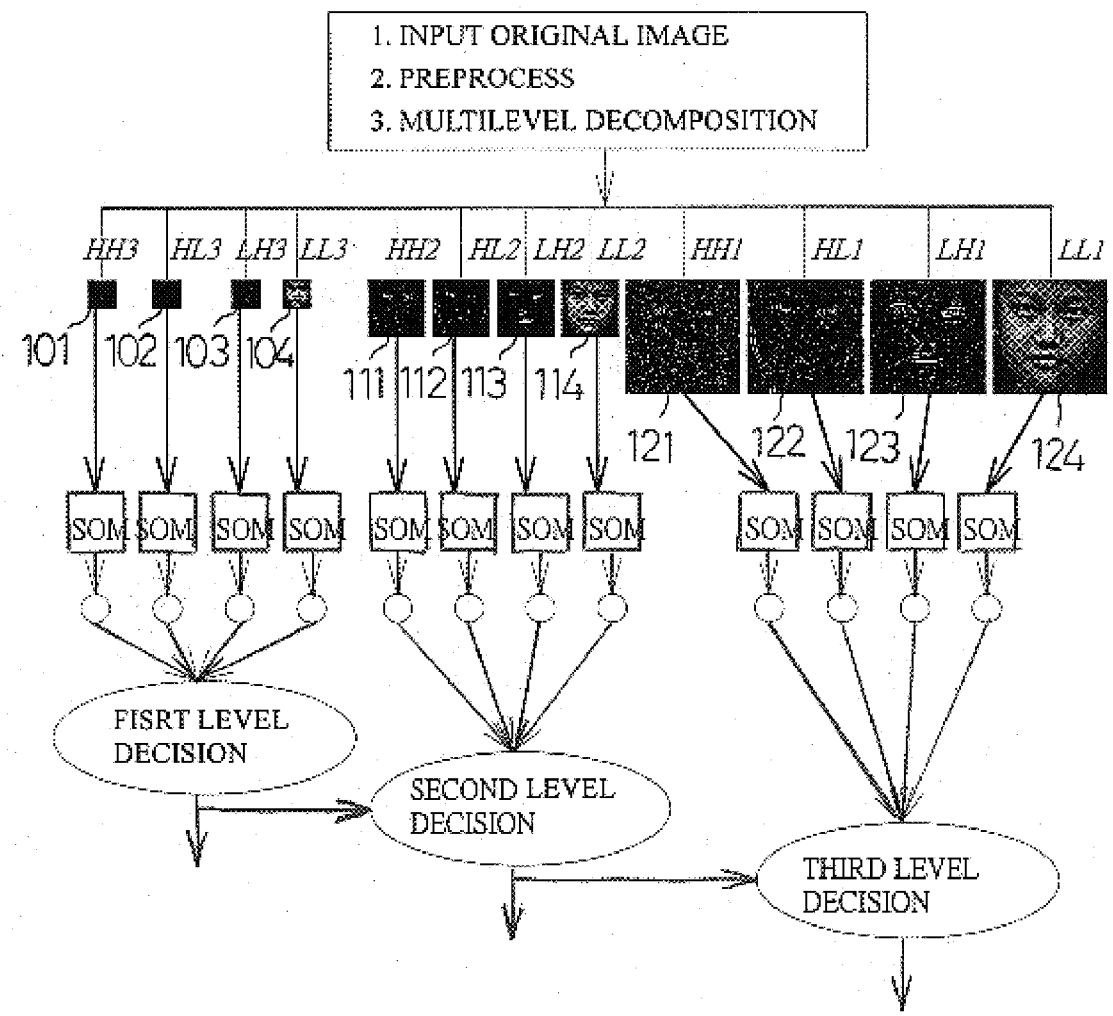
FIG. 8 is a structural view showing the testing stage of the multi-level facial image recognition system in accordance with the present invention.

In the testing stage, with reference to FIGS. 1 and 8, the test image is decomposed. Starting from the four sub-images 101~104 having the lowest resolution, these sub-images are input into the respective SOM neural networks 21 for generating four winning unit (step S16). In step S17, a recognition decision is performed. At first, the distance from these four network winning units to the winning units of each learning image in the corresponding SOM neural network 21 is determined. The inverse value of the distance is used as a reference value of the similarity. Those having a value larger than a threshold is retained and used as a candidate. If there is only one candidate larger than the threshold, then the candidate is the winner, and the decision process is complete. While if the number of candidates having a value larger than the threshold is more than one, these candidates are retained for making a decision in a higher level. That is, the four sub-images 111~114 with a higher level of resolution are processed by the steps S16 and S17 again. After processing, If there is only one candidate that is larger than the threshold, the candidate is the winner, and the decision process is complete. On the contrary, the four sub-images 121~124 with the highest resolution have to be processed by the steps S16 and S17 again for finding a winner, so as to achieve the recognition of facial image.

In view of the foregoing, it is appreciated that the present invention utilizes a multi-resolution decomposition and a neural network to operate with a multi-level decision process to achieve the purpose of facial image recognition. With the characteristic of multiple channel decomposition of a quadrature mirror filter, the original image can be decomposed into four sub-images. The data quantity of each sub-image is only one fourth of the original image so that the amount of operation of a neural network can be reduced and the learning effect is improved. By the property of the non-supervisory classification learning of a SOM neural network, the features are unnecessary to be selected or extracted manually. Therefore, the insufficiency or impropriety in the feature selection can be avoided. The multi-level decision process is able to reduce the amount of data to be compared.

Although the present invention has been explained in relation to its preferred embodiment, it is to be understood that many other possible modifications and variations can be made without departing from the spirit and scope of the invention as hereinafter claimed.

What is claimed is:

1. A method of multi-level facial image recognition, comprising the steps of:

(A) inputting an original image of a face;

(B) performing a pre-process to trim the original image into a facial image only containing a complete face image;

(C) decomposing the facial image into N resolutions, each having M channels, where N≧2 and M≧2, so that the facial image is decomposed into N×M sub-images;

(D) in a learning stage, using a front facial image with a normal expression as a learning image; inputting sub-images decomposed from the learning image to N×M self-organizing map neural networks, respectively, for performing a non-supervisory classification learning; when the neural networks complete a predetermined learning process, the sub-images of the learning image being input to M neural networks that has completed the learning again, so that each neural network generates a winning unit; and (E) in a testing stage, decomposing a test image thereby starting from the M sub-images having a lowest resolution and inputting the sub-images into the corresponding self-organized map neural networks for generating M winning units; performing a recognition decision process for determining distances from the M winning units to the winning units of each learning image in a corresponding self-organizing map neural network thereby finding possible candidates, and if there is only one candidate, the candidate being a winner and the decision process being completed, while there are more than one candidates, the candidates being retained for performing a decision process in a relative high level of resolution.

2. The method of multi-level facial image recognition as claimed in claim 1, wherein, in step (E), the winner is determined by using an inverse value of the distance from the M winning units to the winning units of each learning image in the corresponding self-organizing map neural network as a reference value of similarity, and retaining those having a value larger than a predetermined threshold as candidates.

3. The method of multi-level facial image recognition as claimed in claim 2, wherein, when there is only one candidate having a value larger than the threshold, the candidate is a winner.

4. The method of multi-level facial image recognition as claimed in claim 1, wherein, in step (C), a quadrature mirror filter is used to decompose the facial image into N resolutions, each having M channels.

5. A multi-level facial image recognition system comprising:

means for inputting an original image of a face;

means for performing a pre-process to trim the original image into a facial image only containing a complete face image;

means for decomposing the facial image into N resolutions, each having M channels, where $N \geq 2$ and $M \geq 2$, so that the facial image is decomposed into N×M sub-images; and a plurality of self-organizing map neural networks, wherein, in a learning stage, a front facial image with a normal expression is used as a learning image; the sub-images decomposed from the learning image are input to N×M self-organizing map neural networks, respectively, for performing a non-supervisory classification learning; when the neural networks complete a predetermined learning process, the sub-images of the learning image are input to M neural networks that has completed the learning again, so that each neural network generates a winning unit; and wherein, in a testing stage, a test image is decomposed thereby starting from the M sub-images having a lowest resolution and inputting the sub-images into the corresponding self-organized map neural networks for generating M winning units; a recognition decision process is performed for determining distances from the M winning units to the winning units of each learning image in a corresponding self-organized map neural network thereby finding possible candidates, and if there is only one candidate, the candidate is a winner and the decision process is completed, while there are more than one candidates, the candidates are retained for performing a decision process in a relative high level of resolution.

6. The multi-level facial image recognition system as claimed in claim 5, wherein, in the testing stage, the winner is determined by using an inverse value of the distance from the M winning units to the winning units of each learning image in the corresponding self-organizing map neural network as a reference value of similarity, and retaining those having a value larger than a predetermined threshold as candidates.

7. The multi-level facial image recognition system as claimed in claim 6, wherein, when there is only one candidate having a value larger than the threshold, the candidate is a winner.

8. The multi-level facial image recognition system as claimed in claim 5, wherein the means for decomposing the facial image uses a quadrature mirror filter to decompose the facial image into N resolutions, each having M channels.

* * * * *